United States Patent [19]

Rose

[11] Patent Number: 4,615,264
[45] Date of Patent: Oct. 7, 1986

[54] FILLER DIVERTING VALVE MECHANISM

[75] Inventor: Edward Rose, Skokie, Ill.

[73] Assignee: Peters Machinery Company, Chicago, Ill.

[21] Appl. No.: 723,159

[22] Filed: Apr. 15, 1985

[51] Int. Cl.[4] .......................... A21C 9/04; B29F 3/01
[52] U.S. Cl. .................................. 99/450.4; 99/450.7; 118/25; 425/376 B
[58] Field of Search .......................... 99/450.1–450.8; 425/381, 310, 382 R, 376 B; 118/25, 301, 313; 137/625.11, 625.16; 251/207, 208, 304, 345; 222/485, 486, 553, 554

[56] References Cited

U.S. PATENT DOCUMENTS

| | | | |
|---|---|---|---|
| 3,340,824 | 9/1967 | Talbot | 99/450.4 X |
| 4,162,882 | 7/1979 | Rose | 99/450.4 X |
| 4,469,021 | 9/1984 | Rose et al. | 99/450.4 |

Primary Examiner—Timothy F. Simone
Attorney, Agent, or Firm—Allegretti, Newitt, Witcoff & McAndrews, Ltd.

[57] ABSTRACT

A sandwiching machine for use in applying a semi-frozen comestible such as ice cream, to a row of cookies traveling along said sandwiching machine. The sandwiching machine includes stencil means on the frame for applying the semi-frozen comestible to the cookie in a uniform manner. The stencil means comprises supply means for supplying semi-frozen comestible, return means for the semi-frozen comestible, and shut-off and by-pass valve means for controlling the flow of semi-frozen comestible to a cookie when the valve means is open and for diverting semi-frozen comestible from the supply means to the return means when the valve means is closed. Preferably, the stencil means are fed from each end and a stationary central valve seals the supply means and return means at each side of the stencil means from one another, whereby two adjacent rows of cookies may be supplied with ice cream.

11 Claims, 8 Drawing Figures

U.S. Patent  Oct. 7, 1986  Sheet 1 of 2  4,615,264
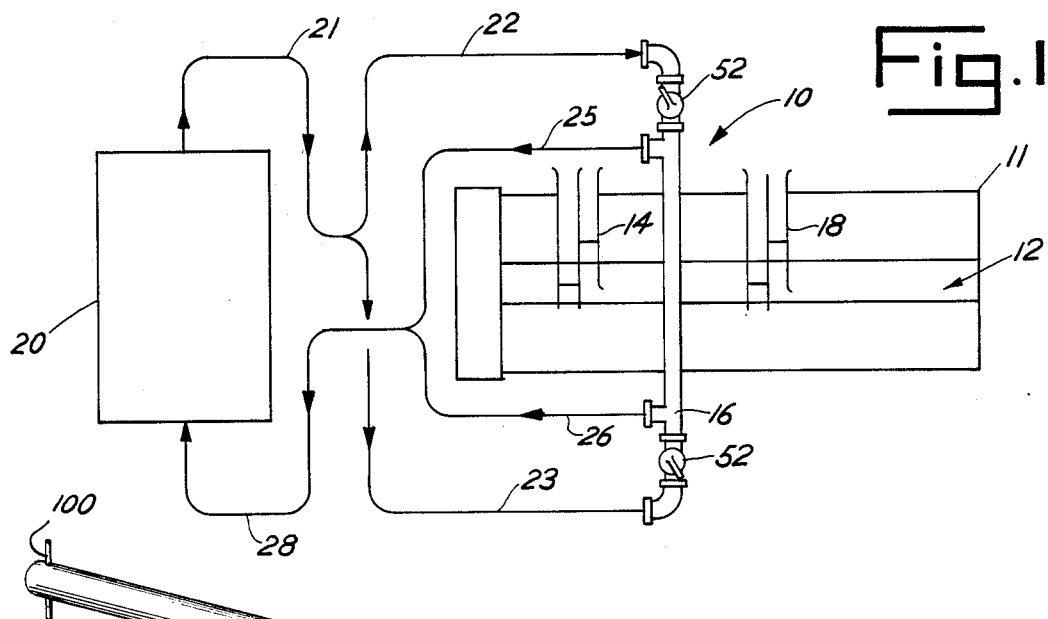
Fig. 1
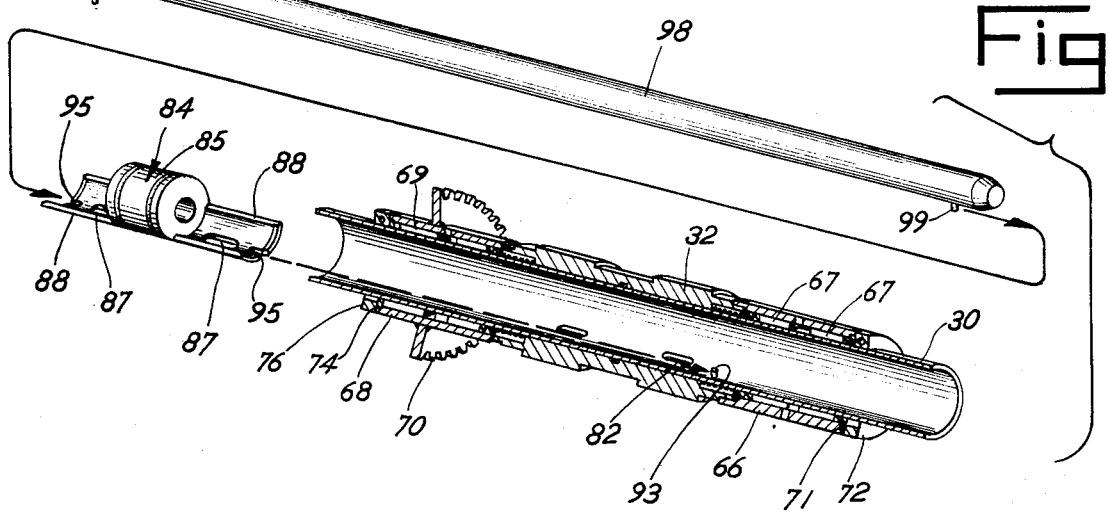
Fig. 6
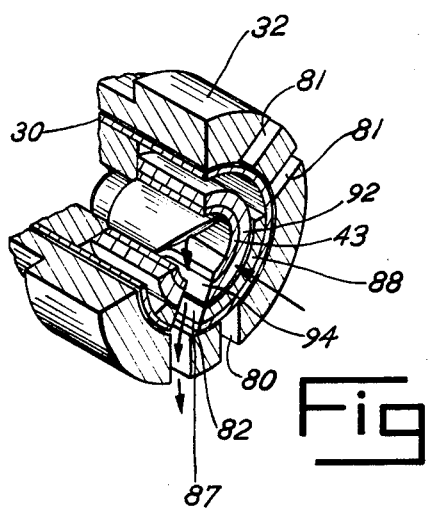
Fig. 7
Fig. 8

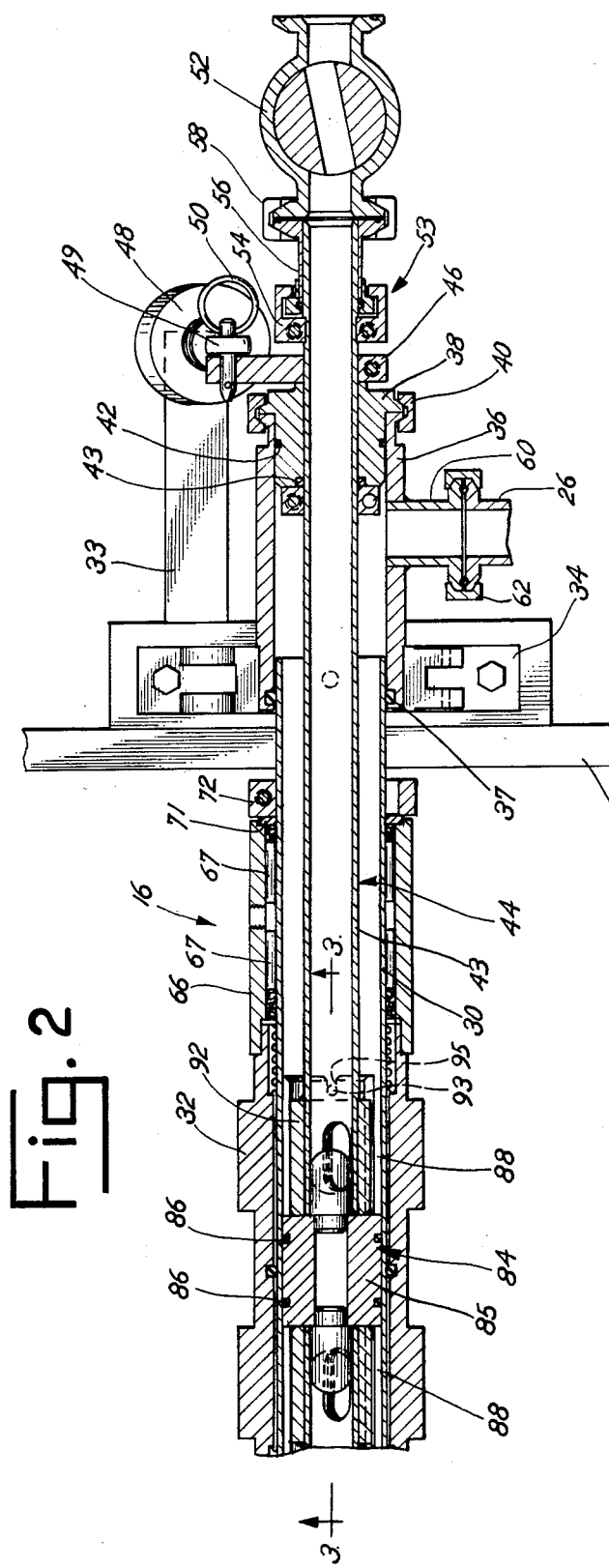
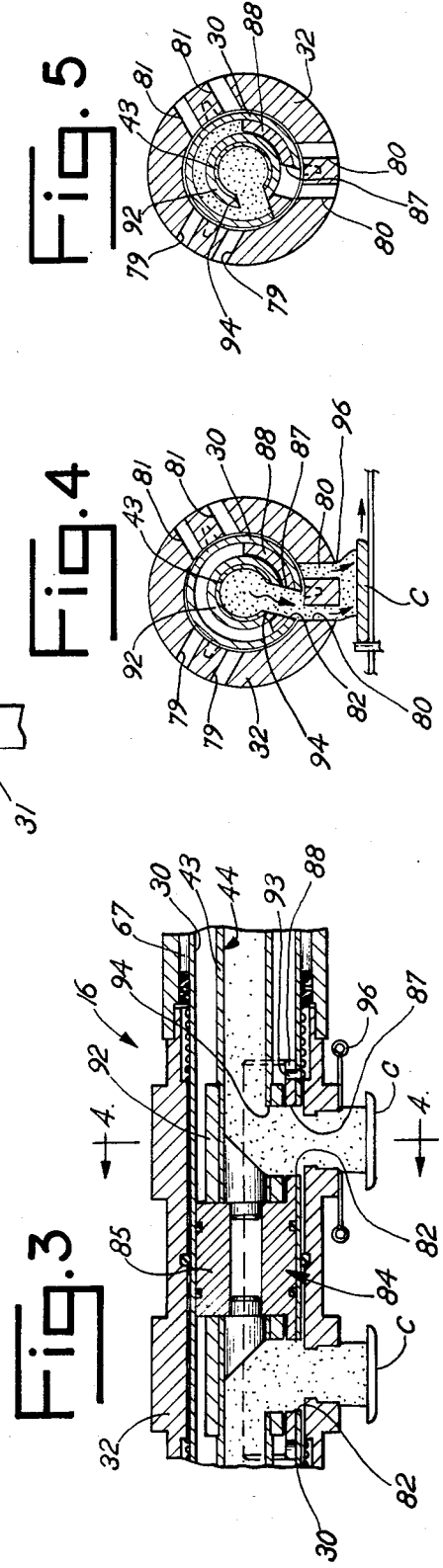

FILLER DIVERTING VALVE MECHANISM

BACKGROUND OF THE INVENTION

This invention relates to a sandwiching machine for depositing a semi-frozen comestible, such as ice cream, between two cookies to make an ice cream sandwich and more particularly, to an improved stencil assembly for use in such sandwiching machine.

Sandwiching machines utilizing the principle of rotary stencil deposition are known in the prior art, for example, Fay U.S. Pat. No. 2,997,453, Fay U.S. Pat. No. 3,119,352, Talbot U.S. Pat. No. 3,340,824, Rose U.S. Pat. No. 4,162,882, and Rose U.S. Pat. No. 4,469,021. The Fay and Talbot patents and Rose U.S. Pat. No. 4,162,882 each disclose a stencil assembly which includes a stencil supported by a driving hub and an idler hub, all rotating on a hollow stationary shaft or tube that is clamped in bearings on the frame of the sandwiching machine. Cream to be deposited is fed from one side of the stencil assembly for deposit on adjacent rows of cookies. In the Rose U.S. Pat. No. 4,469,021, cream is fed from one or two sources to each side of the stencil assembly and is uniformly discharged from the stencil assembly.

While the prior art devices, particularly Rose U.S. Pat. No. 4,469,021, function satisfactorily using a pasty cream or the like filling for a sandwich at room temperature, it has shortcomings when the product to be deposited on the cookies is a semi-frozen comestible, such as ice cream. It is desired that ice cream in a semi-solid state (at about 22° F.) flow from a mixer-freezer to the stencil assembly for making of ice cream sandwiches. Stopping the flow from the mixer-freezer might cause a frozen-solid condition to occur within the mixer-freezer that could prevent further operation. If the sandwiching machine were at room temperature at start up, ice cream contacting the relatively warm surfaces within the stencil assembly would melt and be unsuitable for sandwiching or packaging. This would cause undesirable waste.

An object of the present invention is to provide a sandwiching machine for ice cream which includes an improved stencil assembly for maintaining a steady flow of ice cream through the stencil assembly, both when the shut-off valve is opened and when it is closed.

Another object of the present invention is to provide a sandwiching machine with an improved stencil assembly which incorporates a supply means, a return means, and shut-off and by-pass valve means including a shut-off valve for selectively permitting discharge of ice cream from the supply means onto a cookie or cookies and for diverting ice cream from the supply means to the return means when the shut-off valve is closed. Other objects and advantages of the present invention will be made more apparent hereinafter.

SUMMARY OF THE INVENTION

A sandwiching machine for use in applying a semi-frozen comestible, such as ice cream to one or more rows of cookies traveling along a conveyor in said sandwiching machine. The sandwiching machine includes a stencil assembly for applying the semi-frozen comestible to the cookie or cookies in a uniform manner, said stencil assembly including supply means for supplying the semi-frozen comestible from a mixer-freezer, return means for returning the semi-frozen comestible to the mixer-freezer, and a shut-off and by-pass valve for controlling the flow of semi-frozen comestible to a cookie (or cookies) when the valve is open and for diverting the semi-frozen comestible to the return means when the valve is closed. At start up, the semi-frozen comestible will circulate from the mixer-freezer through the supply means and back to the mixer-freezer through the return means. The components of the stencil assembly will be chilled so that when the rotary shut-off and by-pass valve is opened, semi-frozen comestible will be deposited on to a cookie (or cookies), without waste. Likewise, if the sandwiching machine is stopped after operation has begun, the rotary shut-off and by-pass valve will be closed and semi-frozen comestible can recirculate to the mixer freezer. By automatically returning the semi-frozen comestible to the mixer-freezer for recycling, freeze up and waste is prevented. Further, when the sandwich machine is inoperative, the circulating semi-frozen comestible will contact substantial surface area within the stencil assembly and maintain the components of the stencil assembly chilled so that at start up, the newly formed sandwiches will meet desired standards. As noted above, if the parts of the stencil assembly were to become warm when the sandwich machine was stopped, at start up the semi-frozen comestible would melt, resulting in below standard sandwiches.

BRIEF DESCRIPTION OF THE DRAWING

There is shown in the drawing a presently preferred embodiment of the present invention wherein like numerals refer to like elements in the various views and wherein:

FIG. 1 is a schematic illustration of a sandwiching machine embodying the present invention and including a mixing, aerating and chilling chamber for a semi-frozen comestible;

FIG. 2 is a transverse cross-sectional view of the stencil assembly of this invention;

FIG. 3 is a detail cross-sectional view of the stencil assembly taken generally along line 3—3 of FIG. 2, illustrating the discharge of semi-frozen comestible onto two adjacent cookies;

FIG. 4 is a cross-sectional view of the stencil assembly taken along the line 4—4 of FIG. 3, illustrating the rotary shut-off and by-pass valve in the open position;

FIG. 5 is a cross-sectional view of the stencil assembly similar to FIG. 4, but illustrating the rotary shut-off and by-pass valve in the closed position;

FIG. 6 is a perspective view of the stencil assembly illustrating the installation of the stationary shut-off valve into the stencil assembly by means of a rod-like tool;

FIG. 7 is a detail perspective sectional view of the stencil assembly, illustrating the flow of semi-frozen comestible when the rotary shut-off and by-pass valve is open; and FIG. 8 is a detail perspective sectional view of the stencil assembly similar to FIG. 7, but illustrating the bypass of semi-frozen comestible when the rotary shut-off and by-pass valve is closed.

DETAILED DESCRIPTION OF THE PRESENT INVENTION

Referring to FIG. 1, there is illustrated schematically a presently preferred embodiment of the present invention. The sandwiching machine 10 includes frame 11 supporting a cookie feed and conveying apparatus 12 having rows of cookies carried in side-by-side relationship along taut wires by conveyors traveling at the same rate of speed. There are preferably two or more rows of cookies carried on conveying apparatus 12. The first hopper 14 deposits cookies on the conveyors. The stencil means or stencil assembly 16 applies a semi-frozen comestible, such as ice cream, to the top of the cookie and then a second cookie from hopper 18 is placed on the top of the ice cream on each of the first cookies to complete the formation of the sandwich.

The tank 20 which is a mixing, aerating and chilling or freezing tank is operatively connected to the stencil assembly 16 for supplying the semi-frozen comestible to the stencil assembly and for receiving semi-frozen comestible diverted back from the stencil assembly. A supply line or conduit 21 having branch-feed lines or conduits 22 and 23 is adapted to supply the ice cream to each side of the stencil assembly 16. The ice cream may be returned from each side of the stencil assembly 16 as will be more fully described hereinafter, via lines or conduits 25 and 26 which are joined to return conduit 28.

Referring now to FIG. 2, there is illustrated in cross section a major section of the stencil assembly 16. The stencil assembly 16 includes a stationary hollow stencil sleeve 30 carried transversely on the frame 11 of sandwiching machine 10 and a stencil 32 journalled or rotatably supported on the stencil sleeve. Frame parts 31 and 33 are shown in FIG. 2. The stencil assembly 16 is secured to the frame of the sandwiching machine 10 by quick release clamps 34. The stencil shaft shut-off adaptor 36, that is secured to the end of the stencil sleeve 30, is clamped in place by clamp 34. The quick release clamps are shown more particularly, for example, in Talbot U.S. Pat. No. 3,340,824 and Rose U.S. Pat. No. 4,162,882.

Stencil shaft shut-off adaptor 36 is secured over to the end of the stencil sleeve 30 and O-ring 37 is positioned to seal between the stencil sleeve shut-off adaptor 36 and the stencil sleeve 30. A shut-off adapter plug 38 is adapted to close the open end of the shut-off sleeve adaptor 36. The shut-off plug 38 is held in place by means of a clamp 40. O-ring seal 42 is adapted to insure a sealing relationship between the shut-off sleeve adapter 36 and the shut-off sleeve adaptor plug 38. O-ring seal 45 is adapted to provide a seal between the shut-off sleeve adaptor plug 38 and the tube 43 of the shut-off and by-pass valve means 44, which is disposed within the stencil sleeve 30. The tube 43 and the stencil sleeve 30 are preferably concentric with respect to one another. As will be explained more fully hereafter, the tube 43 forms a supply conduit or supply means for ice cream and the annular passage between the tube 43 and stencil sleeve 30 provides a return passage or return means for the ice cream.

Secured to the tube 43 of the shut-off and by-pass valve or diverting valve mechanism 44 for rotating same is a valve level 46. The valve lever 46 is connected to the piston 49 of air cylinder 48 by means of a quick release connecting pin 50. Swivel joint means 53 mount the equalizing valve 52 on the end of the tube 43. The swivel joint means 53 comprises a first member 54 fixedly secured to the tube 43 of the valve means 44 by means of a clamp and a rotatable swivel 56 journalled on tube 43 and rotatably joined to the first member 54. Clamp 58 fixedly secures the rotatable part 56 of the swivel joint to the housing of the equalizing ball valve 52. The swivel joint means 53 permits tube 43 to be rotated by the control means, i.e., air cylinder 48, while the ball valve 52, attached to a rigid supply conduit, remains stationary. Each ball valve 52 is manually adjusted to equalize the flow of ice cream onto each row of cookies so that ice cream deposit weights are uniform.

The adaptor 36 includes a tubular stub 60 that is connected to the return pipe 26 by means of a clamp 62.

On each side of the stencil 32, there is provided a support hub 66 and 68, respectively. The support hubs 66 and 68 are splined or otherwise connected to stencil 32 so as to rotate therewith about stencil sleeve 30. The support hub 66 functions as an idler support hub and the support hub 68 has a gear 70 (FIG. 6) thereon for driving the stencil 32. The support hub 66 is journalled on bearings 67 and retained in position by means of a thrust washer 71 and a collar 72 which is secured onto the stencil sleeve 30. The support hub 68 is similarly journalled on bearings 69 and retained in position by a thrust washer 74 and a collar 76, which is secured onto the stencil sleeve 30.

The stencil 32 is provided with three pairs of openings 79, 80 and 81 as best seen in FIGS. 4 and 5. The stencil sleeve 30 is provided with spaced apart openings or parts 82 which are adapted to be aligned with the openings 79, 80 and 81 in the stencil 32 to permit discharge of ice cream when the shut-off and by-pass valve member on the tube 43 is open.

Fixed within the stencil sleeve 30 is a stationary valve 84 which functions to separate the internal components of the stencil assembly 16, that is, the valve 84 separates the supply and return passage on the left side from those on the right side. The two sides of the stencil assembly 16 are essentially mirror images of one another so that ice cream may be fed and discharged separately from each side of the stencil assembly 16. Thus, in the embodiment shown, two rows of cookies may be supplied with ice cream. As seen in FIG. 1, there is a ball valve 52 at each end of the stencil assembly 16.

The stationary valve 84 includes a center body or block 85 which is sealed to the interior of the stencil sleeve 30 by means of O-rings 86. Extending outwardly from the body 84 are valve segments 88. The valve segments 88 are formed as segments of a circle, with each having an arc that conforms to the internal configuration of the stencil sleeve 30. The segments 88 each have a flat top portion and level sides. Segments 88 are elongated longitudinally and have an opening 87 adapted to be aligned with the ports 82 in the stencil sleeve 30.

Secured to the internal end of the tube 43 of the valve means 44 is a shut-off valve member 92. The valve member 92 has an opening 94 therein. When the opening 94 is aligned with the openings in the stencil 32, segments 88 of valve 84 and stencil sleeve 30, respectively, then ice cream from the supply means or tube 43 of the valve means 44 may be discharged onto a cookie (or cookies) as shown, for example, in FIGS. 3 and 4. When tube 43 and valve 92 carried thereon are rotated to the closed position, shown in FIG. 5, for example, by actuation of air cylinder 48, then ice cream will be by-passed from the interior of the tube 43 of the valve means 44 to the annular space or return passage provided between the tube 43 and the stencil sleeve 30 for return to tank 20 via the adapter 60, branch line or conduit 26 and return conduit 28.

With reference to FIG. 3, there is illustrated further detail of the construction of valve 92 on the end of the tube 43 of the valve means 44 within the stencil 32 and stencil sleeve 30 and also of stationary valve 84. The stationary valve 84 is properly positioned within the stencil sleeve by a unique arrangement. The outer end of each segment 88 is provided with a recess 95. The recess 95 of the leading edge or first edge of the valve segment 88 inserted into the stencil sleeve 30 is adapted to be engaged with a locator pin 93 affixed to the stencil sleeve 30. By this means, the stencil sleeve 30 will receive the valve 84 with the valve body 85 properly positioned longitudinally, as well as radially, within the stencil sleeve 30.

A cut-off wire 96 may be secured adjacent to the outlet opening 82 from the stencil 30 to sever a measured quantity of ice cream cleanly from the stencil assembly 16 for deposition upon the cookie C. The valve body 92 on the end of the tube 43 of the valve means 44 has an opening 94 therethrough. When the opening 94 in the valve 92 and the openings in the stencil, the segments 88 of valve 84 and the stencil sleeve 30 are in alignment, then the ice cream may flow from the interior of the tube 43, which functions as a supply means for ice cream to be discharged onto a cookie C.

FIG. 4 is a cross section of the stencil assembly 16 taken generally along the line 4—4 of FIG. 3 and illustrating the components in position to permit flow of the ice cream from the interior of the tube 43 onto a cookie C. When the valve 92 is closed, by actuation of the air cylinder 48, secured to tube 43, the valve 92 will be moved to the position shown in FIG. 5. The path to the openings in the stencil sleeve and stencil will be closed. This will cause the ice cream to be diverted from discharge and flow into the annular return passageway between the stencil sleeve 30 and the tube 43 for return through the branch return conduit 26 and the return conduit 28 to the mixing, aerating and chilling tank of mixer-freezer tank 20.

Turning now to FIG. 6, there is better illustrated the method of assembling a valve 84 into the stencil sleeve 30. The locator pin 93 is secured to the interior of the stencil sleeve 30 in position to properly orient the valve 84 in the stencil sleeve. Ball valve 52 is removed to permit access to the interior of stencil sleeve 30. The valve 84 is inserted into the end of the stencil sleeve 30 and pushed forwardly into the stencil sleeve 20 by means of a special rod 98. The rod 98 has a projection 99 on the end thereof which is adapted to engage with a recess 95 in a segment 88 of the valve 84. A cross pin 100 on the opposite end of the rod 98 from the projection 99 functions as a hand grip and helps to orient the valve 84 as desired. That is, the rod 98 is pushed inwardly while maintaining the pin 100 in a generally vertical plane. The valve 84 is pushed inwardly and rotated if necessary until the recess 95 on the inward end of the valve segment 88 is properly positioned on the locator pin 93. Then there is assurance that the opening 87 in each valve segment 88 is properly aligned over the openings 82 in the rotating stencil 32. To remove the valve 84 for cleaning, the ball 52 on the opposite end of the stencil assembly 16 is removed and the rod 98 may be inserted to push the valve 84 out from the other side.

FIGS. 7 and 8 illustrate perspective detail views corresponding substantially to FIGS. 4 and 5 to better show the orientation of the components within the stencil assembly 16. It will be understood that when the tube 43 and valve 92 carried thereon are properly rotated by the air cylinder 48 to effectuate discharge of ice cream, as shown for example in FIG. 7, the openings 94, 87 and 82 will be in alignment so as to permit the discharge of ice cream onto the top of a cookie. When the air cylinder 48 rotates the valve lever 46 and the tube 43 and valve 92 carried thereon are also rotated to a closed position. Then the ice cream will be diverted from the supply means or the interior of the tube 43 to the return passage formed between the stencil sleeve 30 and the tube 43 for return to the mixing, aerating and chilling tank 20 (FIG. 8).

The components of the stencil assembly 16, except for the seals and packing members, are made from metal. This will enhance cooling of the internal components of the stencil assembly 16 when ice cream is flowing through the stencil assembly. Further, the supply means defined by tube 43 is within the return means defined by the annular passage between the exterior of tube 43 and the interior of stencil sleeve 30 to enhance chilling of the internal parts of the stencil assembly when the valve 92 is closed.

There has been provided by the present invention, a novel stencil assembly incorporating shut-off and by-pass valve means for controlling the flow of a semi-frozen comestible, such as ice cream, to a cookie (or cookies) when the valve means is opened and for diverting the semi-frozen comestible when the valve means is closed. If the sandwiching machine is stopped during operation, the valve 92 will be closed and ice cream will be diverted back to the mixer freezer 20. The mixing, aerating and chilling tank 20 may operate continuously without danger of freeze-up because of the diversion of ice cream from within the stencil assembly 16 when the shut-off valve 92 is closed. In addition, at start-up, when the equipment is at room temperature, the shut-off valve 92 may be closed and the semi-frozen ice cream, for example at 22° F. may be circulated through the stencil assembly 16 and returned to the mixing-freezer tank 20. The stencil assembly components are in heat exchange relationship with the ice cream and are cooled so that when the shut-off valve 92 is opened, there will be no waste of the ice cream, as would otherwise occur if the temperature of the stencil assembly 16 were elevated materially above that of the ice cream. By recirculating the ice cream until all parts of the stencil assembly contacting the ice cream are chilled, subsequent ice cream flow will not melt.

It will be understood that in the embodiment shown, if both equalizing ball valves are open, ice cream can be discharged onto two adjacent rows of cookies. By closing one equalizing ball valve, the ice cream will flow to only one row of cookies.

While I have shown the presently preferred embodiment of the present invention, it will be understood that the invention may be otherwise embodied within the scope of the appended claims.

What is claimed is:

1. In a sandwiching machine for use in applying a semi-frozen comestible to a row of cookies traveling along said sandwiching machine, said sandwiching machine including stencil means for applying the semi-frozen comestible to the cookie in a uniform manner, said stencil means comprising supply means for supplying semi-frozen comestible from a source of frozen comestible, said supply means comprising a rotatable tubular member, and return means for returning the semi-frozen comestible to said source of semi-frozen comestible, said return means comprising a stencil sleeve that is hollow and is disposed about said rotatable tubular member and shut-off and by-pass valve means controlling the flow of semi-frozen comestible to a cookie when the valve means is open and for diverting semi-frozen comestible from the supply means to the return means for return to said source when the valve means is closed.

2. A sandwiching machine as in claim 1, wherein the supply means and the return means are concentrically disposed.

3. A sandwiching machine as in claim 2, wherein the supply means and the return means each include tubes, the supply means tube being disposed within the return means tube.

4. A sandwiching machine as in claim 1, wherein there are two supply means and two return means in the stencil means, each pair of supply means and return means being sealed from one another by a valve body in the stencil means.

5. A sandwiching machine as in claim 1, wherein there is a return passage defined between the rotatable tubular member and the stencil sleeve, said return passage communicating with a by-pass port.

6. A sandwiching machine as in claim 1 including control means for rotating the rotatable tubular member.

7. In a sandwiching machine for use in applying ice cream or the like semi-frozen comestible to cookies traveling in a row along said sandwiching machine, said sandwiching machine including stencil means comprising a stencil sleeve and a stencil rotatable thereon, said stencil having a discharge opening and said stencil sleeve having a port adapted to be aligned with said discharge opening in the stencil, valve means within the stencil sleeve for controlling the flow of ice cream through the discharge opening, said valve means including a tube carrying a shut-off valve on the end thereof, said tube being adapted to be connected to a source of ice cream, said tube being disposed within said stencil sleeve and providing an annular return passage within the stencil means, said return passage being adapted to be connected to said source of ice cream, said tube being rotatable to open the shut-off valve to permit flow of ice cream to the cookie and to close the shut-off valve and divert ice cream to the return passage, and control means for selectively positioning the shut-off valve.

8. A sandwiching machine as in claim 7, wherein the source of ice cream is a mixer-freezer tank which is connected by a supply conduit and a return conduit, respectively, to the tube and return passage, respectively.

9. A sandwiching machine as in claim 7 wherein the stencil sleeve has at least two spaced ports and including a stationary block between the spaced ports, a valve means to each side of the stationary block, the outboard end of each tube being secured to a swivel joint, each swivel joint being connected to a supply conduit, whereby the tubes may be rotated, while connected to the supply conduits.

10. A sandwiching machine as in claim 1 including an equalizing valve connected between each tube and its associated supply conduit for equalizing the flow of ice cream to each row of cookies so that ice cream deposit weights are uniform.

11. A sandwiching machine as in claim 7, wherein the control means comprises an air cylinder.

* * * * *